(12) United States Patent
Wilkinson

(10) Patent No.: US 6,907,225 B1
(45) Date of Patent: Jun. 14, 2005

(54) SELECTIVE MEDIA CAPTURE VIA A COMMUNICATION DEVICE

(75) Inventor: Jeffrey Miles Wilkinson, Wellesley Hills, MA (US)

(73) Assignee: Nokia, Inc., Irving, TX (US)

( * ) Notice: Subject to any disclaimer, the term of this patent is extended or adjusted under 35 U.S.C. 154(b) by 307 days.

(21) Appl. No.: 09/982,233

(22) Filed: Oct. 19, 2001

(51) Int. Cl.$^7$ .............................................. H04B 7/00
(52) U.S. Cl. ...................... 455/41.2; 455/3.06; 725/81; 725/123
(58) Field of Search .............................. 455/41.2, 41.3, 455/3.01, 3.03, 3.05, 3.06, 466, 304; 725/61, 81, 86, 87, 99, 123

(56) References Cited

U.S. PATENT DOCUMENTS

| | | | |
|---|---|---|---|
| 5,742,905 A | 4/1998 | Pepe et al. ................ | 455/422.1 |
| 5,809,415 A | 9/1998 | Rossmann ................... | 455/461 |
| 5,917,480 A | 6/1999 | Tafoya et al. | |
| 5,920,311 A | 7/1999 | Anthias | |
| 5,977,983 A | 11/1999 | Einkauf et al. | |
| 6,052,676 A | 4/2000 | Hekmatpour | |
| 6,098,126 A | 8/2000 | Batson et al. | |
| 6,317,609 B1 | 11/2001 | Alperovich et al. ...... | 455/556.1 |

OTHER PUBLICATIONS

The hard reality behind 3G services, http://dailynews.yahoo.com/h/zd/2001070 . . . _hard_reality_behind_3g_services_1.ht 3 pages, dated Jul. 9, 2001.

G. Faria, "Mobile DVB–T Using Antenna Receivers", 7 pages, printed Jul. 11, 2001.

G. Faria, "MCP Report to 42° TM", 12 pages, printed Jul. 11, 2001.

M. Lipsanen, "Interactivity with GSM in a Portable Terminal", Nokia Home Communications, 14 pages, dated Oct. 25, 2000, Downloaded and printed from DVB.org website on Jul. 11, 2001.

*Primary Examiner*—Vivian Chin
*Assistant Examiner*—Lewis West
(74) *Attorney, Agent, or Firm*—Banner & Witcoff, Ltd.

(57) ABSTRACT

Methods and systems for selectively capturing content and delivering the captured content to mobile communications devices via wireless communications are disclosed. In some embodiments, a mobile unit sends a request for content to a nearby content server, to which the content server may respond with a list of available content items. The mobile unit may send a second, refined request for a specific content item. The content server may send the requested content item to the mobile unit, or the content server may send a pointer to the mobile unit, which indicates a network location from which a user may later retrieve the actual content item. In another embodiment, a mobile unit sends a request to a content server for presently displayed content. The content server may capture a screen image and send the captured image to the mobile unit. Alternatively, the content server may send the file in a native file format of the file from which the displayed content was generated.

31 Claims, 8 Drawing Sheets

| File ID | File Name | Authorized Users | Authorized Pages/Slides | Authorized Time(s) | Authorized Date(s) |
|---|---|---|---|---|---|
| 1 | Myslides.ppt | All | All | All | 15 Oct 2001 |
| 2 | Mydocument.doc | All | 2-5,10,13 | All | All |
| 3 | Mydata\Data.txt | bsmith, jjones | All | 0900-1700 | All |
| 4 | Graphic.jpg | Code: <password> | All | All | All |
| 5 | Resultsdata\results.doc | Class: admin | All | All | All |
| 6 | Attendance.doc | All | All | 0900-1700 | M-F |
| 7 | Testresults.pdf | Class: student | All | All | ≥ 10 Dec 2001 |

SELECTIVE MEDIA CAPTURE VIA A COMMUNICATION DEVICE

FIELD OF THE INVENTION

The present invention relates to data sharing and capturing systems. More specifically, the invention provides methods and systems through which users may selectively capture data using a communication device, such as a mobile telephone.

BACKGROUND OF THE INVENTION

When individuals and students watch presentations at a conference or receive instruction in a classroom environment, the individuals will often take notes regarding that which they see and learn. A common practice by speakers and teachers is to project slides onto a large display screen for use as visual aids during the presentation or class. The individuals attending the presentation or class often copy entire slides by hand in the course of taking notes. However, often the speaker or instructor moves too fast, and displays the next slide before an individual can copy the previous one.

In addition, individuals often request a copy of a data file even though she may only need a specific item from the file. For instance, a conference attendee may request a copy of a forty-slide PowerPoint® presentation given by a conference speaker because the attendee wants a copy of the statistics located on slide fifteen. The attendee gives her email address to the speaker, who later emails the attendee a copy of the complete presentation, using more storage space than if the speaker could send, or otherwise provide, only a copy of the requested slide to the attendee. In addition, the speaker must expend time to prepare and send the email to the requestor.

Thus, it would be an advancement in the art to provide an automated system that allows individuals to capture content as it is displayed on a display screen, such as by using a mobile or portable device.

However, portable devices' storage capacities are often limited and prohibitively small for capturing data files generated from or stored on a conventional PC computer. If a user wants to copy a data file from a conventional PC, and the user does not have a storage medium (e.g., floppy disk) with enough storage capacity to copy the wanted data file, the user cannot copy the file. Portable devices such as mobile telephones and personal digital hassistants (PDAs) often include only limited storage capacities, e.g., 8 MB up to 64 MB, compared to 10 gigabyte (GB) to 100 GB hard drives on conventional PCs. Thus, users often cannot copy data files using only a portable device, as the device may not contain enough free memory to copy the entire data file.

One known solution to this problem is to send the wanted data file via a computer network to a requestor's email inbox or network storage drive. However, network storage drives, including those used to store emails, quickly become saturated as users forward copies of data files to large email and network distribution lists. In addition, the email system may store multiple copies of the data file, one for each user receiving it, and the receiving users may each then save a copy of the data file to their own network drive. Furthermore, these forwarded data files may be stored but never read by the requesting user(s), thus wasting limited storage space.

A known solution to the above problem is to edit the file before sending it to the requesting user, so that only the requested slide is sent. The presenter can also restrict and/or redact specific slide content within the presentation, for the purposes of protecting the content or other proprietary information, before sending any slides to the requesting user. However, this is time consuming and quickly becomes tedious as multiple users each request different portions of the same file.

Thus, it would be an advancement in the art to provide a system that allows users to copy data files using a portable device with limited storage capacity. It would be another advancement in the art to provide a system that allows users to copy an image on a display screen or a portion of a file at a user's or file owner's discretion, rather than being required to copy the entire file. It would be a further advancement if the system could provide, to a requesting user, a pointer to a storage location from which the user could later retrieve the file. It would be a further advancement in the art to provide an automated system for distributing data content on demand that requires minimal effort by a file provider.

BRIEF SUMMARY OF THE INVENTION

A first aspect of the invention provides a wireless selective content distribution and capture method, including a set of steps. A content server receives a first request for available content items from a nearby mobile unit over a wireless medium. The content server tramsmits a first response to the mobile unit, wherein the first response includes information associated with available content items. The content server receives a second request for a specific content item from the mobile unit. The content server transmits a second response to the mobile unit including data corresponding to the specific content item.

In some embodiments, the second response includes a link to a network location from which the specific content item may be retrieved. In other embodiments, the second response includes the actual content item. The mobile unit may open a data channel with a network store and relay the specific content item to the network store via the data channel.

In various embodiments of the invention, the mobile unit and content server communicate using low power radio, including Bluetooth, or infrared light.

The mobile unit may be a mobile telephone, personal digital assistant, or other portable computer device.

In some embodiments, the content server authenticates the mobile unit before sending one of the first and second responses.

The inventive method may also be embodied in a content server, a mobile unit, and a computer readable medium.

Another aspect of the invention provides a wireless selective content distribution and capture method, including a set of steps. A content server wirelessly receives a request for content from a nearby mobile unit. The content server identifies data corresponding to a video display image displayed at a time when the request is received, and sends a response to the mobile unit. The response includes data corresponding to the identified data.

In some embodiments, the response includes a link to a network location from which the identified data may be retrieved. In other embodiments, the response includes the data file from which the displayed video display image was generated. In still other embodiments, the response includes a graphic file storing a representation of the displayed video display The method may be performed by a content server apparatus including a video input port for receiving a video display signal, and the captured video image is based on the video display signal. The content server apparatus may further include a video output port through which the received video display signal is retransmitted.

The method may also be embodied in a computer readable medium or a mobile unit.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

Using methods and systems of the invention as described herein, users may capture data files, or portions of data files, from a nearby content server using a mobile device. In general, users may capture data files using wireless communication links between a mobile device and a content server. The mobile device may then store the content in the device itself, or act as a conduit to stream the data to a network storage device. Alternatively, the device may capture a pointer to a data storage location, which may be used for later retrieval of the data file or a portion thereof.

The invention allows users to use mobile devices including, but not limited to, a mobile telephone, personal digital assistant (PDA), laptop or palmtop computer, or other mobile device with wireless communications capabilities, to request and capture data from a content server. Wireless communications technologies that may be used include infrared, Bluetooth, 802.11, GSM, CDMA, wireless LAN, or any other known wireless communications technology.

Figure 1:
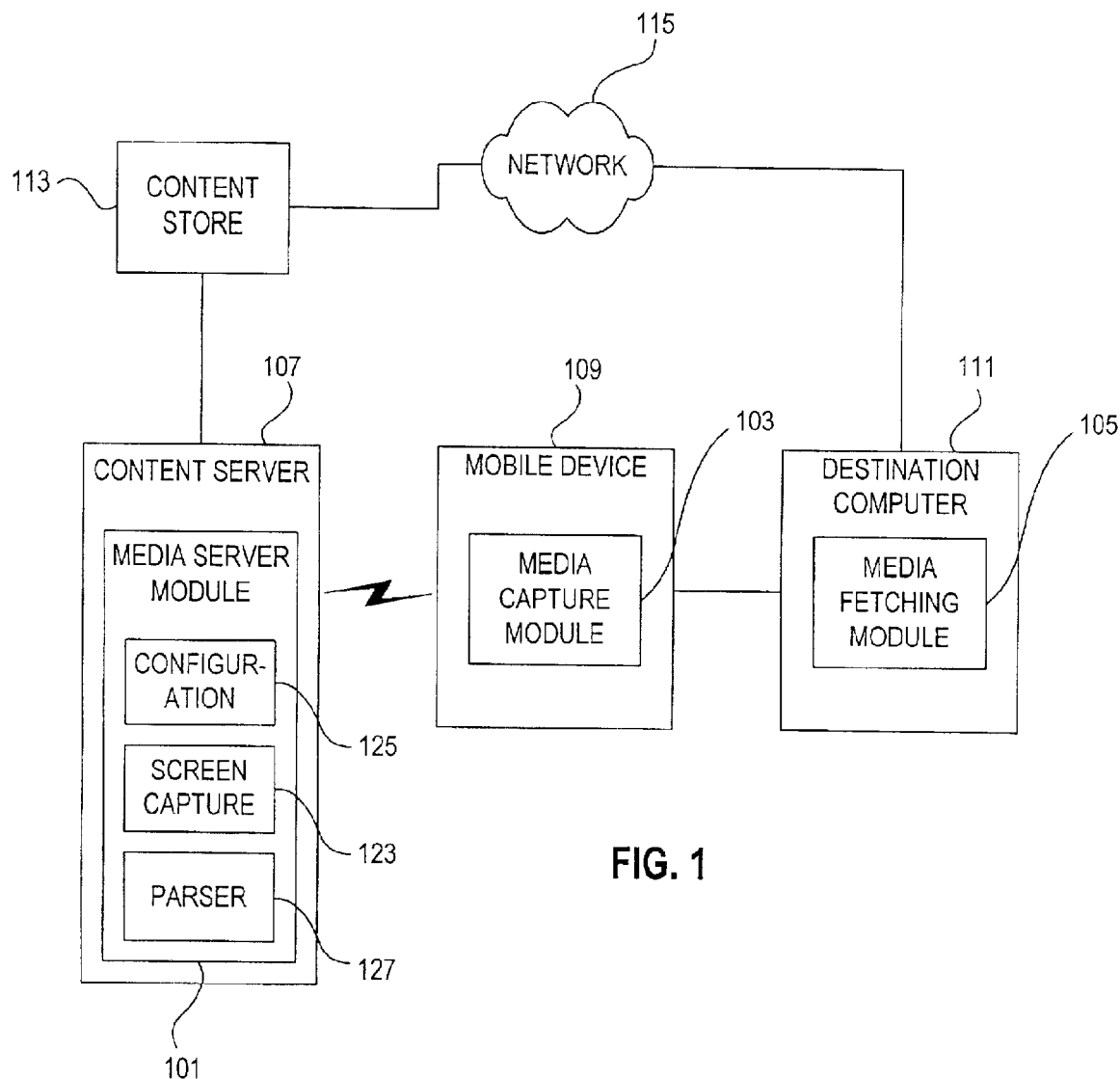
FIG. 1 illustrates a block diagram of an embodiment of the invention.

An embodiment of the invention is described with reference to FIG. 1. The inventive system may use three primary software modules, each residing on a separate device, to request, serve, and fetch content. There is a server module 101, a capture module 103, and a fetching module 105. More or fewer software modules may alternatively be used, depending on design factors, user needs, and the like. Server module 101 typically resides on a computer 107 connected to a content store 113 that contains content available to be served in response to user requests. The data store may alternatively be located within the same computer 107 as server module 101. The server module receives content requests from mobile devices 109 and serves the requested content, or a link to the requested content, to the requesting mobile device. Server module 101 may include submodules for performing various tasks, including parser submodule 127, configuration submodule 125 and screen capture submodule 123, all of which are described in more detail below. The computer 107 on which server module 101 resides is referred to as a content server.

Parsing submodule 127 may be used to strip pages from multiple page files. That is, if a ten page Word® document is the basis of a request, the parsing submodule may strip out each page, creating ten one-page Word® documents, each containing a single page of the original ten page document. The parser submodule may also automatically create pointers to the storage location of each stripped page, which the server module may then provide to mobile units upon request, as described below. That is, server module 101 may send to any given mobile device the actual content and/or a pointer to a location from which the actual content may later be retrieved.

The capture module 103 typically resides on a mobile device 109, and provides the user interface through which a user can request content from a content server. The capture module may store the content locally after the content server has served it to the mobile device. Alternatively, when server module 101 sends a link to the requested data, the capture module stores the link on the mobile device for further use.

The fetching module 105 typically resides on a user's conventional computer 111, such as a laptop or desktop personal computer. The fetching module 105 downloads from the mobile device that which was served to the capture module 103 by server module 101. That is, when the content served to the capture module includes a complete data file, or a portion of a data file, the fetching module downloads the data to the PC by interacting with the capture module on the mobile device. When the served content includes a link to data, the fetching module downloads the link to the conventional PC, reads the link data, and fetches the content from the location defined by the link, such as content store 113, via one or more computer networks 115. The device on which a fetching module resides is referred to as a destination computer.

For instance, using the above-described architecture, a speaker ("originator") may give a speech at a conference or other gathering of people, during which he or she uses as a visual aid slides projected from a laptop computer onto a large screen using a computer display projector. The originator can make available to attendees copies of the set of slides, or individual slides within the set, by configuring a server module on his or her laptop to serve the requested slides or links thereto to mobile devices upon request. The laptop computer may act as both a content server and a content store. Copies of the requested data may be served in the data file's native format (e.g., PowerPoint® slides may be served as .PPT files), as a graphical image of the slide (e.g., as a GIF, TIFF, BMP, or other graphical format file), or in a proprietary format used specifically for purposes of data transfer.

Figure 2:
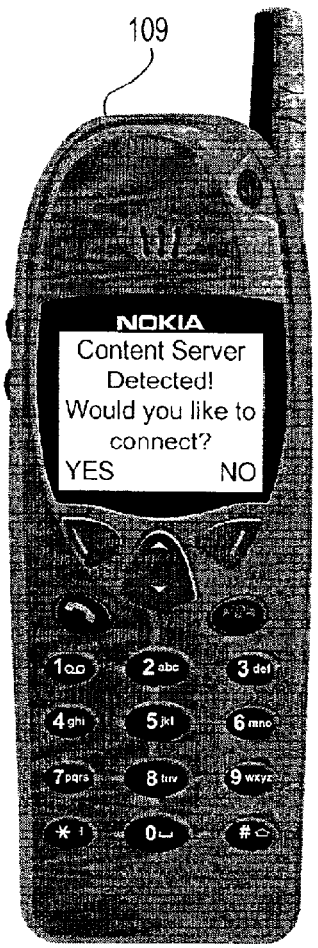
FIG. 2 illustrates a mobile device with a display screen after detecting a content server.

Media server module 101 may emit a polling signal (via wireless technology) indicating that it is available as a content server. When a mobile device is in the proximity of content server 107, in this instance the laptop on which the slide file is stored and from which the slides are projected, media capture module 103 will receive and interpret the signal. Mobile device 109 may optionally display a message on its display screen indicating that a content server has been detected, or play a sound, or provide some other indication to the owner/user of the mobile device. An example of a notification screen is shown in FIG. 2.

Figure 3:
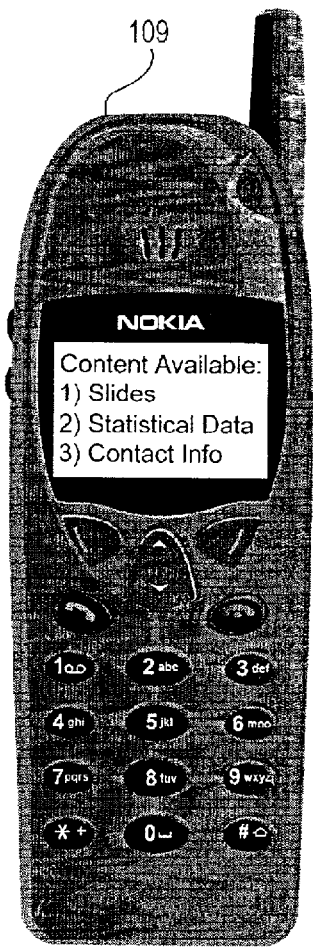
FIG. 3 illustrates a mobile device displaying a file selection screen.

As each attendee ("recipient") views the slides during the presentation, she may decide that she would like a copy of one or more of the slides. Using her mobile device 109, for instance a mobile telephone, the recipient may connect to server module 101 by pressing the button directly below the 'YES' option in FIG. 2. FIG. 3 illustrates a selection screen after the mobile device 109, under the control of capture module 103, connects to server module 101. The selection screen displays a list of files being served by server module 101 that are available for recipients to request. While, in this example, recipients may only be aware of the slides being projected by the originator's computer onto the screen, the content server 107 may store multiple files available for recipients to request, and indicate to recipients that other files are available. In this example, the presentation slides, a data file (e.g., statistical data referred to in the presentation), and a contact information file (e.g., containing the speaker's contact information, such as telephone and email, in known file formats) are available. Any file may be made available at the originator's discretion.

Figure 4:
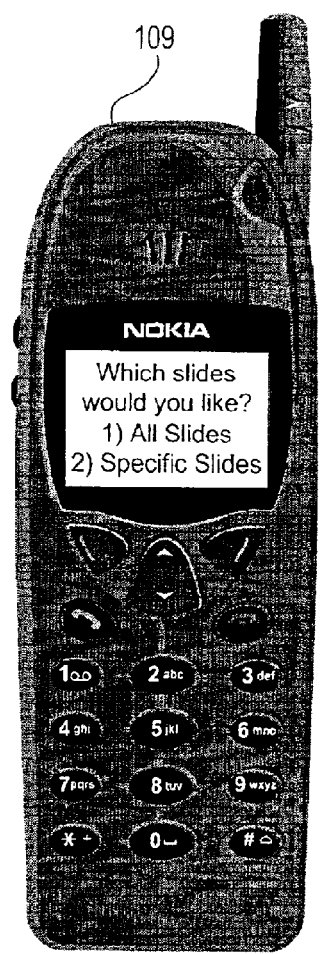
FIG. 4 illustrates a mobile device displaying a portion selection screen.

When the user selects the keypad number associated with the desired file, the mobile device may send the selection to server module 101. The server module may send a response to the capture module 103 on the mobile device 109, including an indication of that which the user may further select from within the initially selected file (e.g., slides versus pages, allowed pages, total number of pages, etc.). The capture module interprets the response, and the mobile device displays a second selection screen, such as a slide selection screen shown FIG. 4.

Figure 5:
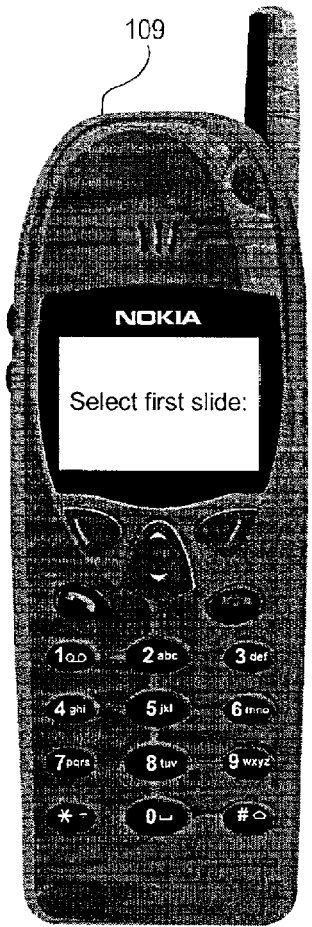
FIG. 5 illustrates a mobile device displaying a range beginning query.
Figure 6:
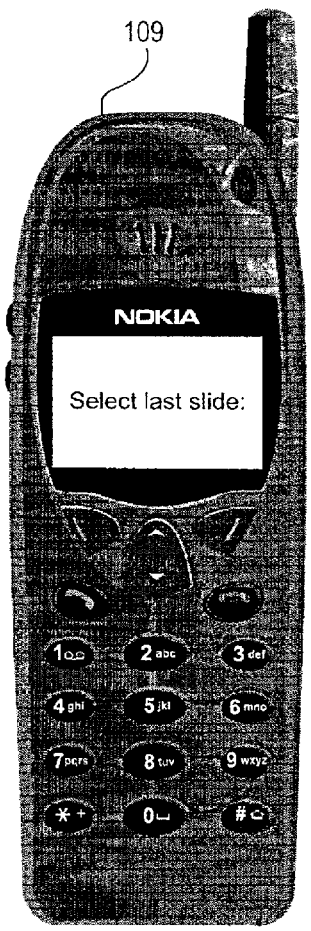
FIG. 6 illustrates a mobile device displaying a range ending query.
Figure 7:
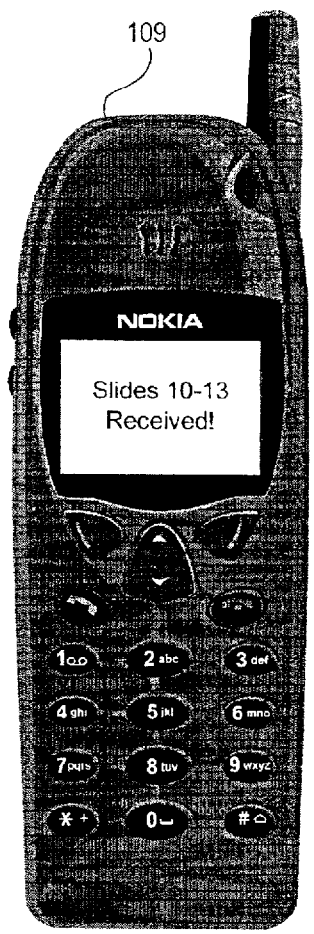
FIG. 7 illustrates a mobile device displaying a transfer complete screen.

From the slide selection screen, the recipient may select that the only wants to receive specified slides, instead of receiving the complete set of slides, by selecting keypad button '2'. The recipient then enters the first slide she wants, for instance slide '10,' in response to a first query illustrated in FIG. 5. The recipient next enters the last slide she wants, for instance slide '13,' in response to a second query illustrated in FIG. 6. Server module 101 then sends the requested content from the content store 113 to the mobile device 109. Again, the content store 113 may be located on the same computer 107 or a different computer than that on which server module 101 is stored and executed. When the requested content has been sent, the mobile device 109 may display a notification, such as that illustrated in FIG. 7. When the recipient requests pages out of the range of total or allowed pages, an error message may be displayed (not shown) or alarm sounded. It should be appreciated by those skilled in the art that other slide selection schemes may also be used.

The recipient may later download the content to a destination computer by connecting the mobile device to the destination computer, using either wireless communications, or by direct cable connection between the mobile device and the destination computer. Capture module 103 and fetching module 105 interface in such a manner that the content is downloaded from the mobile device to the destination device. Interface techniques are known in the art, such as are used for synchronizing telephone numbers and other information on a mobile telephone or PDA with information contained on a computer. When the content is a pointer, the fetching module 105 retrieves the actual content from the network, as defined by the pointer. In one embodiment, fetching module 105 contains logic that allows a user to edit the pointer so that the user may request more or fewer pages than originally requested, when allowed.

Figure 8:
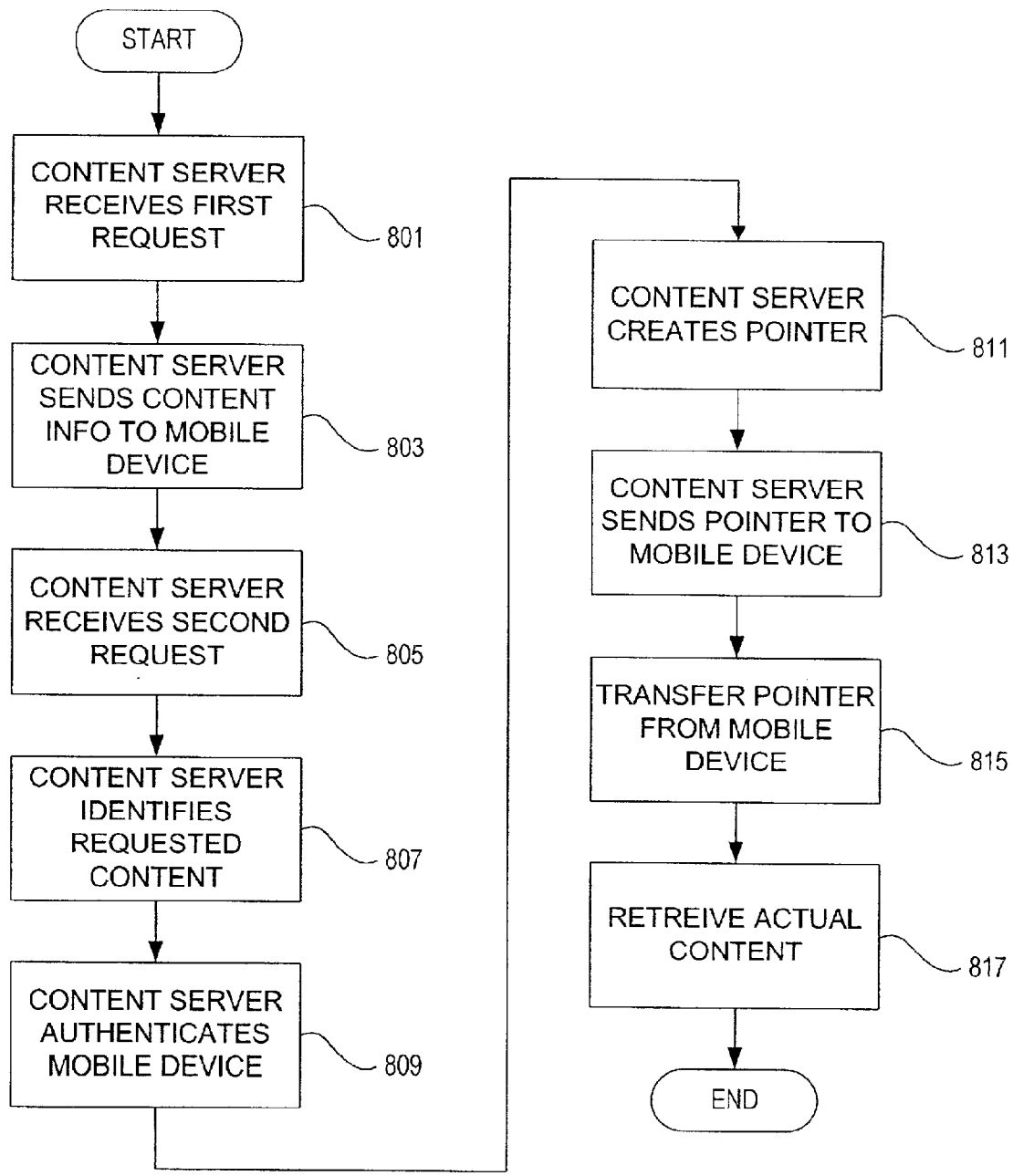
FIG. 8 illustrates a flowchart of a method according to an embodiment of the invention.

FIG. 8 illustrates a method according to an embodiment of the invention. In step 801, the content server 107 receives a first wireless request for content from a mobile device 109. The content server 107 provides the response to server module 101 for processing. In response to receiving the first request in step 803, server module 101 sends a response to the capture module 103 on the requesting mobile device 109, indicating the available content. The mobile device in step 805 sends a second request to the content server 107. The second request may contain refined information indicating the specifically requested content. In response to receiving the second request, server module 101 interprets the second request, in step 807, to determine the content that the recipient is requesting.

Server module 101 may optionally authenticate the request, in step 809, to determine whether the recipient is authorized to receive the requested content and/or to confirm the identity of the mobile device 109. That is, each request may include an indication of the mobile device's and/or the recipient's identity. Server module 101, using known encryption and authentication techniques, may confirm that the mobile device 109 is the mobile device that it claims to be, and also whether the user of that mobile device is authorized to receive the requested content.

Upon confirming that the mobile device is authorized to receive the request content, server module 101, in step 811, may create a pointer to a location of the requested file, including an indication of the specifically requested portions (e.g., slides, pages, worksheets, data, etc.). A pointer may be a URL, such as the following:

/151.61.42.64/trainingslides/mypresentation.ppt(slide 7)

/244.13.43.15/documents/mywordfile.doc(entire file)

It should be apparent to those of skill in the art that various pointer formats may alternatively be used, as long as the pointer contains an indication of the requested file, and optionally an indication of specifically requested portions of that file. Finally, in step 813, server module 101 sends the pointer to the requesting mobile device via wireless communications. Each mobile device may simultaneously store multiple pointers or data files, limited only by the mobile devices' internal memories, by repeating the above method.

The recipient, in step 815, transfers the pointer(s) from the mobile device. In one embodiment, the pointer(s) are transferred to a destination computer having access to the network on which the actual content is stored. The destination computer executes the fetching module to download the captured pointers and, in step 817, retrieves the actual captured content via the network.

Alternatively, if the mobile device is connected to the network and the mobile device has enough resources (e.g., memory), the mobile device may contain a fetching module as well as a capture module, and the mobile device itself may fetch the content from the network.

In another embodiment, the mobile device may transfer the pointer(s) to a secondary storage device, from which the pointer(s) may later be -retrieved. The mobile device may transfer the pointer(s) to any device or storage location with which it can communicate. Depending on the specific mobile device's capabilities (e.g., WAP mobile phone, GSM mobile phone, PDA with wireless Internet access, etc.), the pointer(s) may be transferred to and stored on an Internet accessible hard drive (e.g., Xdrive.com), a remote server, at a specified URL or FTP site, on a hard drive on a LAN, or on any other storage device. Thus, if the mobile device is GSM mobile phone, the pointer(s) may be transferred via an SMS (Short Message Service) message to any SMS-enabled recipient However, if the mobile device is a WAP phone, the phone may send a command to an Internet storage hard drive, FTP site, or other networked storage location and store the pointer(s) at that storage location. The same or a different user may later retrieve the pointer(s) from their stored locations and retrieve the actual content from the location defined by the pointer(s).

It should be apparent to one of skill in the art that the above steps may be performed in other than the recited order. For example, authentication step 809 may be performed after the content server receives the first request from the mobile unit. It should also be apparent that some steps may be optional, e.g., at least authentication step 809. Additional steps (not shown) may also be performed to provide a more robust and secure system. That is, more than one or two request/response pairs may be used to provide varying levels of security and authentication. In addition, rights management and forward lock restrictions may be imposed for the stored content, and therefore use additional security measures as are known in the art. The additional security measures, in turn, typically require additional communications between the content server and/or the network and the mobile device and/or the destination device.

As referenced above, server module 101 may be configured using configuration submodule 125 to provide selected files only to a predetermined or otherwise authorized set of recipients. That is, when an originator specifies that a data file is available for recipients to request, the originator may configure server module 101 to only allow predetermined recipients, or a predetermined class of recipients, to have access to the file. In addition, the originator may configure server module 101 to allow recipients to have access only to specified portions of each data file. Still further, the originator may configure server module 101 to allow recipients to have access to each data file only at specified times and/or on specified dates.

Figures 9, 10:
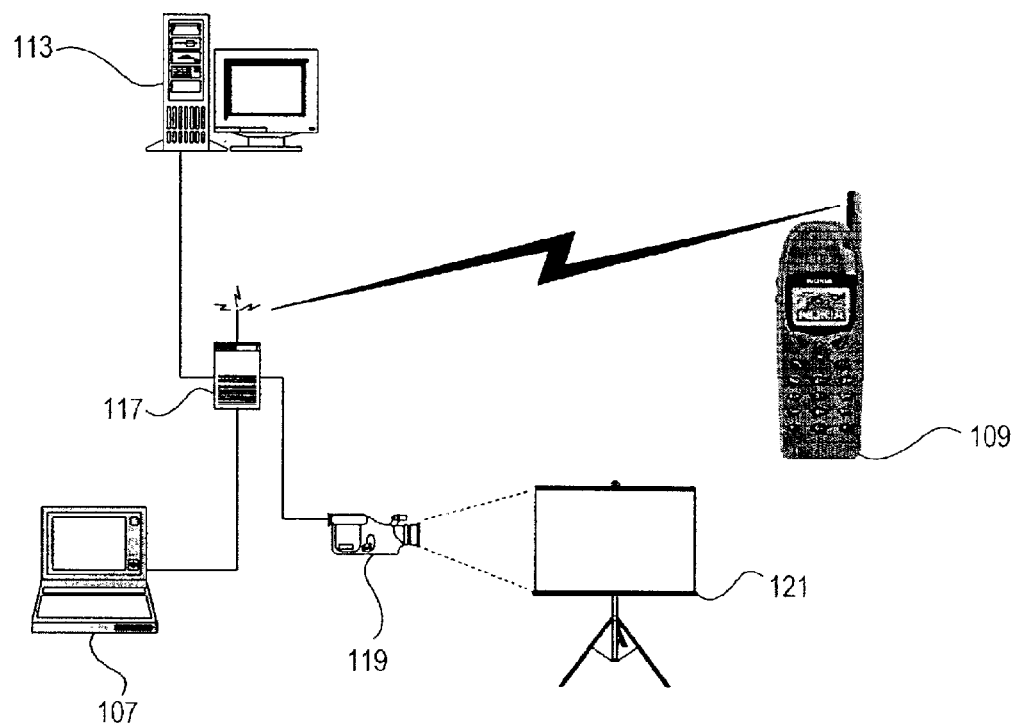
FIG. 9 illustrates a table representative of server module configuration data.
FIG. 10 illustrates a schematic diagram of an embodiment of the invention.

FIG. 9 illustrates a tabular representation of server module configuration data. The configuration data specifies which data files are available for request, which recipients have access to each file, when recipients have access to each file, and which portions of each file a recipient may receive. The data in FIG. 9 indicates that the entirety of file no. 1 is available to all users at all times, but only on Oct. 15, 2001 (e.g., at a one day public presentation). Only pages 2–5, 10, and 13 of file no. 2 are available, but they are available to all users at all times on all days. The data further indicates that only users 'jjones' and 'bsmith' have access to file no. 3, and then only between the hours of 9 AM and 5 PM. File no. 4 is available to any user that knows the file password. That is, when a user requests file no. 4 or any portion thereof, server module 101 sends a response to capture module 103 indicating that a password is required. Capture module 103 prompts the user for a password, which upon entering is relayed to server module 101. If the recipient entered the correct password, then the file (or a pointer) is served to the mobile device 109.

The data also indicates that file no. 5 is only available to a class of recipients. Specifically, those recipients that have administrator privileges, as indicated by the recipient's authentication information, as is known in the art. File no. 6 is available to all users, but only during conventional working hours on weekdays. File no. 7 is available to all recipients identified as students, but only on or after Dec. 10, 2001 (e.g., to distribute exam results). It should be readily apparent to those of skill in the art that unlimited combinations of restrictions are possible, and restrictions based on other variables, such as a recipient's age or gender, or geographic location, may also be used.

Server module 101 may also be configured to serve content in various data formats. In a first embodiment, server module 101 always serves the content in the native data format in which the originator provided the file. In this embodiment, server module 101 may contain logic, for instance parser 127, to automatically copy only those pages/slides requested by a recipient, and paste the requested portions into a new file in the native file format The new file is then sent to the mobile device 109, or placed on a content store 113 for the recipient to fetch at a later time using the pointer served by server module 101.

In another embodiment, because not all computers can read and understand the same file types, server module 101 provides content in a single data format, such as a standard or proprietary graphic format. Examples of file formats that may be used include GIF, JPG, TIFF, PDF, BMP, and the like, or a proprietary format for use only by server module 101, capture module 103, and fetch module 105, and related software. Server module 101, and more specifically screen capture submodule 123 and parser submodule 127, may be configured to copy a screenshot of each requested page of a requested data file, and paste each page into a new file as a graphical image. Server module 101 may store the requested pages in the new file on the content store 113, and send a pointer to the requesting mobile device 109 for that new file. Alternatively, server module 101 may send a pointer to mobile device 109 for each requested page of the requested file. In this manner, server module 101 is not required to create a new unique file for each recipient, and at most one screenshot of each page is needed. In yet another embodiment, either the originator or the recipient may request the file be served in a specified format, when available.

Users (originators) may configure server module 101 in any manner as is known in the art. In one embodiment, the configuration submodule 125 includes a configuration application, through which an originator can add a file to the list of available files, remove a file, or edit a file's availability criteria. For each file, the originator can specify the criteria under which the file is available to recipients, as discussed above, using the configuration application.

In one embodiment, the configuration submodule 125 may also be integrated into a computer's operating system and/or known application programs, as is known in the art. For instance, upon installing the server module on a computer, a new menu option called "add to content server" (or similar) may be added to the menu of items that appear when a user right-clicks on a data file in any of the operating system's various screens. Operating systems with which the system may be integrated include Windows®, UNIX, Mac OS®, Palm OS®, Symbian Epoc, and the like.

Figure 13:
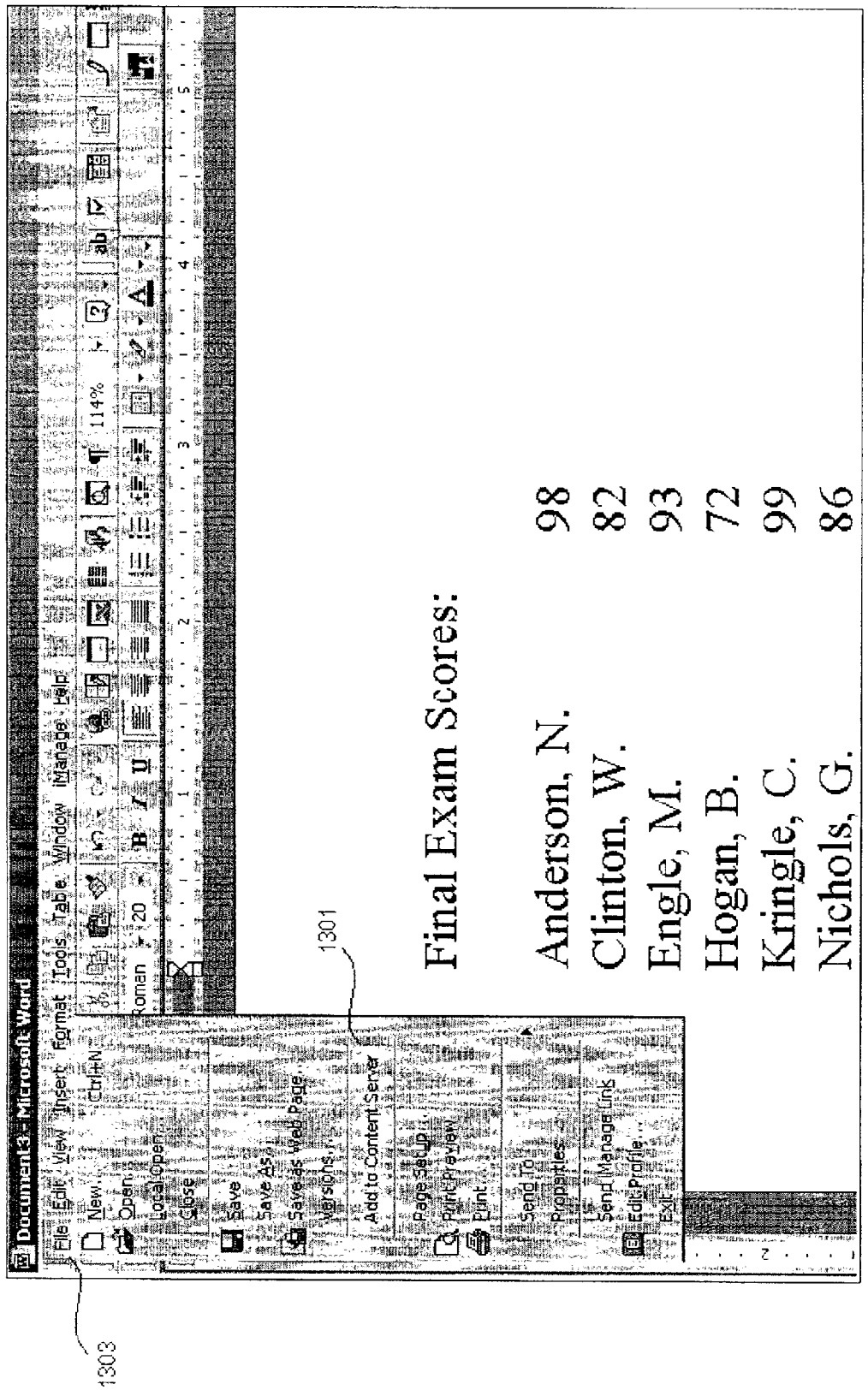
FIG. 13 illustrates a portion of a screenshot of an application program adapted according to an embodiment of the invention.

With reference to FIG. 13, in another embodiment there may also or alternatively be a similar new menu item 1301 (or button) added to a menu (or toolbar) in known applications, such as the 'File' menu 1303 in Microsoft Word®, Microsoft PowerPoint®, Corel WordPerfect®, and the like. When a user selects the new menu option 1301, content server 107 activates the server module 101, which prompts the user for the criteria under which the new file is available for request by recipients. After setting the availability criteria, the file is added the server module's 101 database of available files.

In an embodiment of the invention, server module 101 may be tied to that which is presently displayed on the host computer's display screen or is presently being sent to the host computer's video output port. That is, server module 101 may be configured to serve only that which a recipient can see. In this embodiment, the originator activates and deactivates server module 101 at his or her discretion, thus allowing recipients to only receive information as decided by the originator. For instance, an originator may activate server module 101 at the beginning of a presentation so that recipients can request and receive copies of the presentation slides, and deactivate server module 101 when the presentation is completed.

Figure 15:
FIG. 15 illustrates a mobile device displaying a get current item screen according to an embodiment of the invention.

While the content server is active, recipients may send a request for the presently displayed information, such as is shown in FIG. 15. When server module 101 receives the request, the server module instructs screen capture submodule 123 to capture the present screen information, e.g, by taking a screen shot of the display or by capturing the video output stream. In one embodiment, server module 101 then stores the screen information into a new graphic file, and sends the new graphic file to the requesting mobile device. In another embodiment, server module 101 pastes the screen information into a new graphic file, stores the new graphic file on the content store 1 13, and sends a pointer referring to the new graphic file, to the requesting mobile device 109. The recipient may then download the pointer at a later time to a destination computer 111, as described above.

Because it is possible that a recipient's destination computer 111 may not be connected to the same network as the content store 1 13, another embodiment of the invention uses the mobile device 109 as a streaming or packet-based file transfer conduit. That is, server module 101 may send the actual data to the mobile device 109. The mobile device simultaneously opens a data channel with the recipient's network, and stores the data on a remote storage device through the data channel. The remote storage device may be an Internet storage device, a network hard drive, the recipient's computer's hard drive, and the like, so long as the mobile device is capable of opening a data channel with the remote storage device, as is known in the art. When the data transfer is complete, the mobile device closes the data channel. The data transfer through the mobile device from the originator's content store to the recipient's network storage may be streamed or packet-based, as is known in the art, and the data file may be sent to the remote storage device as it is received from the content server, without waiting for the complete file to be received from the content server. Using a mobile device as a transfer conduit, recipients may receive data when the complete data file is larger than the available memory on the mobile device and/or when the recipient's destination computer is not connected to the same network as the data store.

In another embodiment of the invention, the mobile device 109 may store the data file on an attached memory module, such as a single inline memory (SIM) card, memory stick, SmartMedia card, or the like. The recipient may later download the information from the memory module to a destination computer using conventional techniques.

Figure 11:
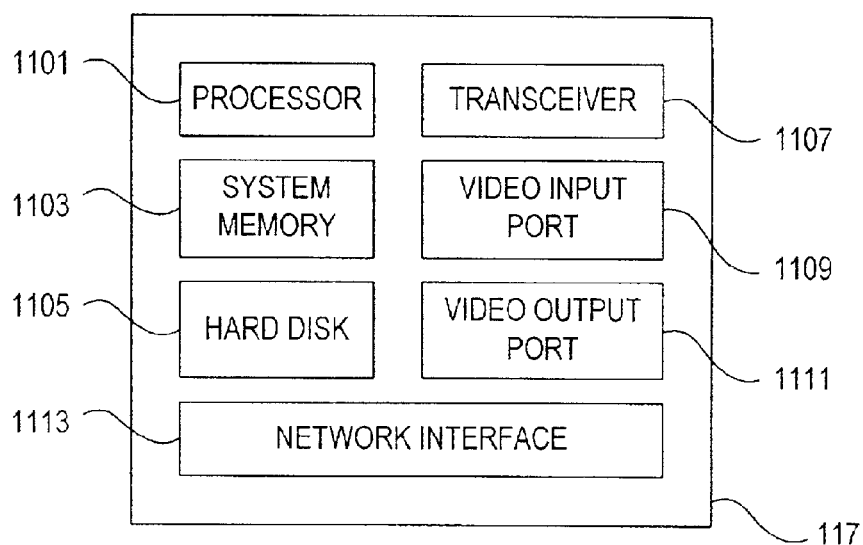
FIG. 11 illustrates a block diagram of a content server according to an embodiment of the invention.

With reference to FIGS. 10 and 11, in another embodiment of the invention, server module 101 may be stored in and executed by a content server 117, separate from host computer 107. The content server 117 may be connected to the video output port of host computer 107, and may include a processor 1101, system memory 1103 (e.g., RAM, ROM, etc.), hard disk 1105, transceiver 1107, video input port 1109, video output port 1111, and network interface 1113. The processor 1 101 may be used to control operations of the content server 117. The hard disk 1105 may be used for storing data, application software and operational software. The transceiver 1107 may be used for receiving requests from and sending content (or pointers) to mobile devices. The video input port 1109 may be used for receiving video content from the host computer's video output port (e.g., a monitor output port on a laptop computer).

When the content server 117 receives a request from a mobile unit via transceiver 1107, the content server captures to system memory 1103 or hard disk 1105 the presently displayed video information from the host computer's video output port as it is received through video input port 1109. The content server 117 writes the screen information to a file as a graphical image, and sends the image file to the requesting mobile device via transceiver 1107.

In one embodiment, the server device 117 is connected to a network store 113 through network interface 1113. When the server device 117 receives a request for content from mobile device 109, content server 117 writes the captured display information to a data file, and sends the file to network store 113. The content server 117 then sends a pointer corresponding to the data file's location to the requesting mobile device 109. Recipients may then obtain the data file from the network store 113 via a destination computer 111 and fetching module 105, as described above, by downloading the pointer from mobile device 109 to destination computer 111 or any other pointer storage location with which it can communicate.

Because many computers only contain one video output port, and because originators may want to use the external server device 117 while giving a presentation to one or more users, the server device 117 may optionally include a video output port 1111, through which the video output from the host computer 107 is retransmitted as it is received through video input port 1109. A computer display projector 119 maybe connected to the video output port 1111 in order to project the display image onto a screen 121.

In another embodiment of the invention, content server 117, in addition to being connected to the video port of computer 107, may also be networked with computer 107. When content server 117 receives from mobile unit 109 a request for content that is presently displayed, content server 117 may request from computer 107 (or network store 113) a copy of the actual data file (or a pointer to its location) from which the display is generated, and either server the actual data file (or a selected portion) in its native file format or a pointer to its location to the requesting mobile unit, as in any of the embodiments described above.

Figure 14:
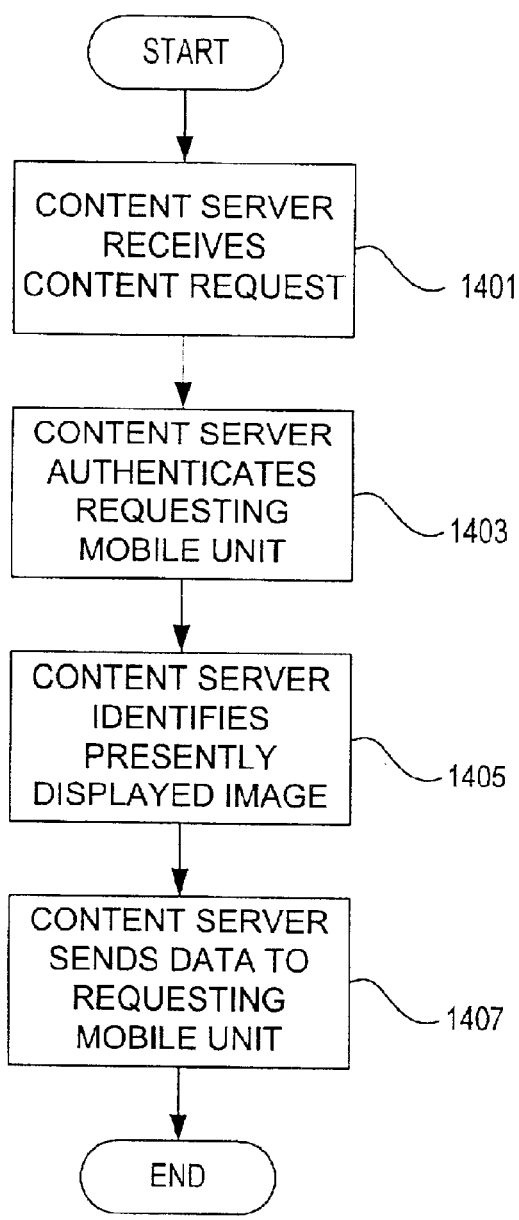
FIG. 14 illustrates a flowchart of a method according to an embodiment of the invention.

A general method for performing an embodiment of the invention where the served content is based on a file presently displayed on a display screen is illustrated in FIG. 14. Initially, when a user views an image on the display screen, and the user would like a copy of the image or the underlying data file from which the image was generated, the user sends a request to the content server via her mobile device in step 1401. Optionally, in step 1403, the content server authenticates the requesting mobile unit to determine whether the user associated with the mobile unit is authorized to receive the requested file and/or information represented by the file, as discussed above.

In step 1405, the content server identifies the image at the time when the request was received. In step 1407, the content server sends response data corresponding to the image to the requesting mobile device. The response data varies, depending on the implementation, as discussed above. In one embodiment, the response data is a graphical image file, e.g., a GIF file, containing a screenshot of the identified image. In another embodiment, the response data is the complete data file from which the identified image was generated. For instance, if the identified image is slide four in a ten slide PowerPoint® presentation, the response data may be a PowerPoint® .PPT file containing all ten slides. Alternatively, the response data may be a PowerPoint® .PPT file containing the one identified image slide, stripped from the complete file by the server module's parser submodule 127 (FIG. 1). In yet another embodiment, the response data includes a link to a network storage location from which any of the aforementioned response data files may be retrieved.

In another embodiment of the invention, the system may be configured so that the mobile device provides a storage location pointer to the content server. That is, instead of the content server determining the data file's storage location on a network, the mobile device (or its user) may determine the data file's storage location and send a storage location pointer to the content server. The content server may then store the requested data file at the location defined by the user-provided pointer. In this manner the requested data file corresponding to the requested content may be automatically placed at a storage location of the user's choosing, without requiring the user to later retrieve that data file from a remote location, as in any of the above embodiments. If the user is required to later retrieve the data file, it is at least from a location chosen by the user.

It should be readily apparent to one of skill in the art that the inventive system may be used to provide data other than slides from a presentation or pages from a word processing document. Data in any file format may be requested and distributed according to the invention, including, but not limited to, video, static and animated graphic images (GIF, TIFF, JPEG, Bitmap, etc.), clear text, mail messages, audio, CAD graphics, and the like. The inventive system may also be used to provide information on selected products or services, such as in a retail store environment. When a recipient (e.g., a retail customer), while in a retail store (e.g., a music store), is in the proximity of a host computer configured with a content server, the customer may be notified of available content. The customer may then have the option of requesting data related to various items in the store, such as information about music CDs, upcoming events at the store, samples of current hit songs, and the like.

Figure 12:
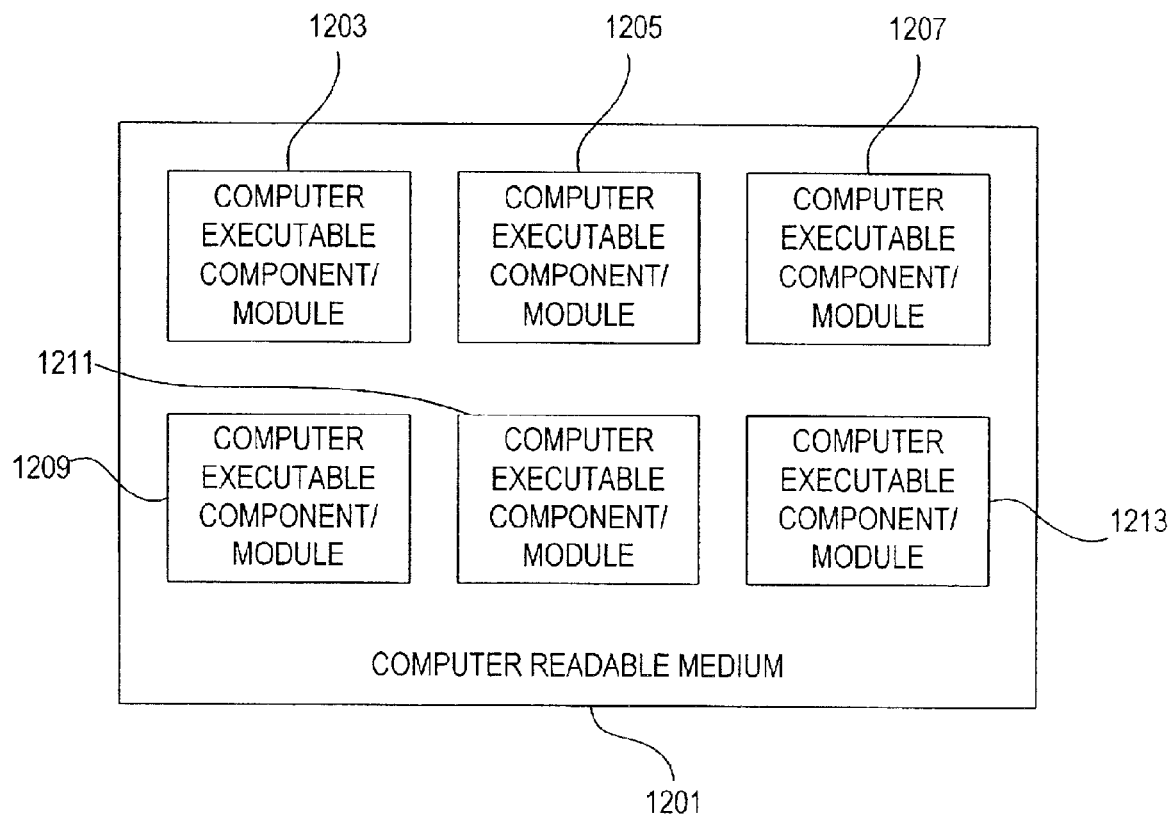
FIG. 12 illustrates a block diagram of a computer readable medium according to an embodiment of the invention.

The inventive methods may be embodied as computer readable instructions stored on a computer readable medium such as a floppy disk, CD-ROM, removable storage device, hard disk, system memory, or other data storage medium. FIG. 12 illustrates a block diagram of a computer readable medium 1201 that may be used in accordance with one or more of the above described embodiments. The computer readable medium 1201 stores computer executable components, or software modules, 1203–1213. More or fewer software modules may alternatively be used. Each component may be an executable program, a data link library, a configuration file, a database, a graphical image, a binary data file, a text data file, an object file, a source code file, or the like. When one or more computer processors execute one or more of the software modules, the software modules interact to cause one or more computer systems to perform according to the teachings of the present invention.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A content distribution method, comprising steps of:
   (i) a content server wirelessly receiving a request for content from a mobile unit via a transceiver of the content server, wherein the mobile unit is located within a short-range wireless operational area served by the transceiver of the content server;
   (ii) the content server identifying data corresponding to a video display image displayed at a time when the request is received; and
   (iii) the content server sending a response to the mobile unit via the transceiver, wherein the response comprises a data file corresponding to the identified data, wherein step (ii) is performed by capturing a screen image of the displayed video image, and wherein the data file comprises the captured screen image.

2. The method of claim 1, wherein the data file comprises data in a native file format of a file from which the displayed video image is generated.

3. The method of claim 1, wherein communication between the content server and the mobile unit is via low power radio.

4. The method of claim 3, wherein communication between the content server and the mobile unit is via Bluetooth protocols.

5. The method of claim 1, wherein communication between the content server and the mobile unit is via infrared light.

6. The method of claim 1, further comprising the step of authenticating the mobile unit prior to transmitting the response to the mobile unit.

7. The method of claim 1, wherein the mobile unit comprises a mobile telephone.

8. The method of claim 1, wherein the mobile unit comprises a personal digital assistant.

9. The method of claim 1, wherein the mobile unit comprises a laptop computer.

10. A content server, comprising:
    a processor;
    a transceiver;
    a video input port for receiving a video display signal;
    memory for storing computer readable instructions that, when executed by the processor, cause the content server to perform the steps of:
    (i) receiving a request for content from a mobile unit within a short-range wireless operational area served by the transceiver of the content server;
    (ii) identifying data corresponding to a video display image displayed at a time when the request is received; and
    (iii) sending a response to the mobile unit via the transceiver, wherein the response comprises a data file corresponding to the identified data, wherein step (ii) is performed by capturing a screen image of the displayed video image, based on the video display signal, and wherein, in step (iii), the data file comprises the captured screen image.

11. The content server of claim 10, wherein the transceiver receives requests and sends responses using low power radio.

12. The content server of claim 11, wherein the transceiver receives requests and sends responses using Bluetooth protocols.

13. The content server of claim 10, wherein the transceiver receives requests and sends responses using infrared light.

14. The content server of claim 10, wherein the computer readable instructions further cause the content server to perform the step of authenticating the mobile unit prior to transmitting the response via the transceiver.

15. The content server of claim 10, wherein the mobile unit comprises a mobile telephone.

16. The content server of claim 10, wherein the mobile unit comprises a personal digital assistant.

17. The content server of claim 10, wherein the mobile unit comprises a laptop computer.

18. The content server of claim 10, wherein the response comprises data in a native file format of a file from which the displayed video image is generated.

19. A content server, comprising:

a processor;

a transceiver;

a video input port for receiving a video display signal;

a video output port;

memory for storing computer readable instructions that, when executed by the processor, cause the content server to perform the steps of:

(i) receiving a request for content from a mobile unit within a short-range wireless operational area served by the transceiver of the content server;

(ii) identifying data corresponding to a video display image displayed at a time when the request is received by capturing a screen image of the displayed video image, based on the video display signal, wherein the received video display signal is retransmitted through the video output port; and (iii) sending a response to the mobile unit via the transceiver, wherein the response comprises a data file corresponding to the identified data, said data file comprising the captured screen image.

20. A mobile unit, comprising:

a transceiver that communicates with a content server when the mobile unit is within the short-range wireless operational area served by the content server;

a processor;

memory for storing computer readable instructions that, when executed by the processor, cause the mobile unit to perform the steps of:

(i) sending a request for content to the content server; and (ii) receiving data from the content server via the transceiver, said data comprising a captured screen image of a video image displayed at a time when the content server received the request for video content.

21. The mobile unit of claim 20, wherein the short-range wireless operational area uses low power radio.

22. The mobile unit of claim 21, wherein the short-range wireless operational area uses Bluetooth protocols.

23. The mobile unit of claim 20, comprising a mobile telephone.

24. The mobile unit of claim 20, comprising a personal digital assistant.

25. The mobile unit of claim 20, comprising a laptop computer.

26. The mobile unit of claim 20, wherein the computer readable instructions further cause the mobile unit to send authentication information to the content server.

27. The mobile unit of claim 20, wherein the received data comprises a data file in a native file format from which the video image is generated.

28. A computer readable medium storing computer executable instructions that, when executed by a content server, perform a content distribution method, comprising steps of:

(i) the content server wirelessly receiving a request for content from a mobile unit via a transceiver of the content server, wherein the mobile unit is located within a short-range wireless operational area served by the transceiver of the content server;

(ii) the content server identifying data corresponding to a video display image displayed at a time when the request is received, wherein said identifying comprises capturing a screen image of the displayed video image; and (iii) the content server sending a response to the mobile unit via the transceiver, wherein the response comprises a data file corresponding to the identified data, and wherein the data file comprises the captured screen image.

29. The computer readable medium of claim 28, wherein the data file is in a native file format of the video display image displayed at the time when the request is received.

30. The computer readable medium of claim 28, wherein the computer readable instructions further perform the step of authenticating the mobile unit prior to sending the data file to the mobile unit.

31. The computer readable medium of claim 28, wherein the step of wirelessly receiving the request for content from the mobile unit comprises wirelessly receiving the request for content from a mobile telephone.

* * * * *

UNITED STATES PATENT AND TRADEMARK OFFICE
CERTIFICATE OF CORRECTION

PATENT NO. : 6,907,225 B1
DATED : June 14, 2005
INVENTOR(S) : Jeffrey Miles Wilkinson It is certified that error appears in the above-identified patent and that said Letters Patent is hereby corrected as shown below:

Title page,
Item [56], References Cited, U.S. PATENT DOCUMENTS, insert

| | | |
|---|---|---|
| -- 5,819,160 | 10/1998 | Foladare et al. |
| 6,173,317 | 1/2001 | Chadda et al. |
| 6,490,432 | 12/2002 | Wegener et al. |
| 6,505,160 | 1/2003 | Levy et al. |
| 6,507,727 | 1/2003 | Henrick |
| 6,516,191 | 2/2003 | Greenspan et al. |
| 2003/0027517 | 02/2003 | Callway et al. |
| 6,529,584 | 3/2003 | Ravago et al --. |

Signed and Sealed this

Twenty-eighth Day of March, 2006

JON W. DUDAS
*Director of the United States Patent and Trademark Office*